May 22, 1956 — J. W. NEEDLES — 2,746,150
BITE RECORDER
Filed July 30, 1953

INVENTOR.
JOHN W. NEEDLES
BY Edward B. Gregg
ATTORNEY

United States Patent Office 2,746,150
Patented May 22, 1956

2,746,150

BITE RECORDER

John W. Needles, Glendale, Calif.

Application July 30, 1953, Serial No. 371,301

7 Claims. (Cl. 32—19)

This invention relates to a bite recorder for recording the spherical movement of human dentures; that is, it relates to a mechanical means for providing a record, tracing or impression of the movements of the human dentures during mastication.

In constructing a set of artificial dentures it is important that the dentures occlude properly. Proper occlusion involves not only a proper bite when the teeth are closed, but it also involves proper movement of the dentures forwardly and rearwardly (the protrusive-retractive movement), proper lateral movement and proper intermediate or compound movements which are the resultant of simultaneous protrusive-retractive and lateral movements. These movements are a function of the tempero-mandibular joint. In addition to these movements, the dentures also undergo movements resulting from the cusp form of the teeth.

It is important that artificial dentures be so constructed in relation to the tempero-mandibular joint, that they will occlude properly.

In the spherical theory of articulation, the occlusal surface of the teeth is considered to be a segment of a spherical surface, and the protrusive-retractive, lateral and intermediate or resultant movements of the teeth can be shown to be gliding movements on the surface of this sphere.

Spherical articulators are available which provide a universal joint for suspending the upper dentures to simulate these spherical movements. However, the geometry of dentures varies from one patient to another, hence there is a need for adjusting the articulator to accurately reproduce the spherical movements. One form of spherical articulator which may serve the purposes of the present invention is that of my United States Patent No. 1,368,408, granted February 15, 1921, entitled "Articulator". Another and preferred form of articulator is that of my copending application Serial No. 370,295, filed July 27, 1953, entitled "Articulator".

It is an object of the present invention to provide a bite recorder and a bite recording technique which, without undue difficulty and without any great degree of skill, can be employed to accurately record the spherical movements of dentures as produced by the tempero-mandibular joint.

Another object is to provide a bite recorder and technique by which adjustments can be made, without the necessity of a face bow, in a spherical articulator to adjust the same for accurate reproduction of the proper movements of a particular patient's dentures.

These and other objects of the invention will be apparent from the ensuing description and the appended claims.

One form of the invention is illustrated by way of example in the accompanying drawings in which, Figure 1 is a perspective view of the upper assembly of my bite recorder.

Figure 1:
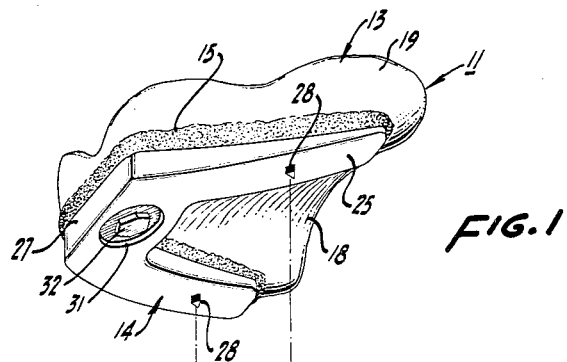
Figure 2:
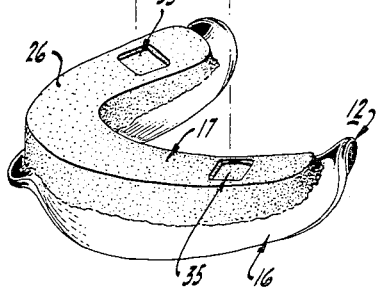
Figure 2 is a perspective view of the mating, lower assembly of my bite recorder.

Referring now to the drawings, the bite recorder of my invention is generally indicated by the reference numeral 10, and it comprises an upper assembly shown at 11 in Figure 1 and a lower assembly shown at 12 in Figure 2 which mates with the upper assembly 11. The upper assembly 11 comprises an upper base plate 13 molded from any suitable dental composition such as shellac, and to which an upper bite rim 14 is cemented by wax or other suitable cementing agent shown at 15. The lower assembly comprises a lower base plate 16 to which is fixed a lower bite rim 17, the lower base plate 16 being of the same construction as the upper base plate 13 and the lower bite rim being constructed of modelling compound.

As will be seen, the upper base plate 13 is formed with a convex body portion 18 (i. e., convex as viewed from above) to fit the roof of the mouth and with a concave edge or rim 19 of arcuate shape to fit the upper jaw, i. e., to fit over the upper gums of a patient whose teeth have been extracted. The lower base plate 16 is similarly constructed but lacks a body portion corresponding to the body portion 18, and it is concave at 20 (as viewed from below) and is of arcuate shape to fit over the lower jaw or gums.

The under surface 25 of the upper bite rim 14 is convex as viewed from below, and it constitutes a segment of a spherical surface having a radius of four inches, which sufficiently approximates the average radius of the spherical surface of occlusion of adult dentures. The mating upper surface 26 of the lower bite rim 17 is concave and constitutes a segment of a spherical surface of the same radius.

Figure 3:
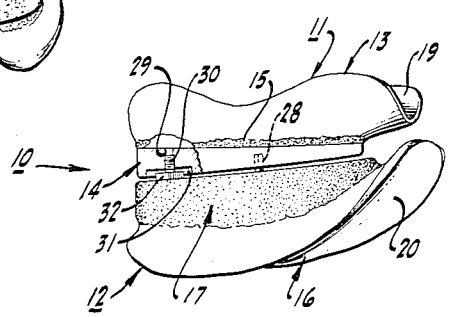
Figure 3 is a view in side elevation, partly broken away, of the upper and lower assemblies of Figures 1 and 2 in occlusal relation.

The upper bite rim is preferably of transparent, hard plastic construction such as Lucite, which is the trademark of E. I. du Pont de Nemours Company for an acrylic resin. The front edge 27 of the upper bite rim is preferably squared as shown and frosted so that data such as the median line of the face can be recorded on the rim. Graving pins 28 are embedded in the upper bite rim on opposite sides thereof, as shown, such graving pins being preferably of hard metal construction and having a triangular cross section with sharp edges at the angles or corners. These graving pins project one or two millimeters from the surface 25. As is best shown in Figure 3, the upper bite rim 14 is formed at its front portion with a threaded hole 29 to receive a screw 30. Alternatively, a nut or threaded bushing (not shown) may be embedded in the plastic rim to receive the screw 30. The rim is milled at 31 to countersink the head 32 of the screw 30. The head is preferably broad and flat and is squared to receive a socket wrench, and its outer surface is preferably rounded to approximate the spherical radius of the surface 25 of the upper bite rim. The depth of the recess 31 is preferably such that the head 32 of screw 30 is flush with the surface 25 when the screw 30 is screwed in to its limit.

In use the bite recorder thus illustrated and described is employed as follows: The screw 30 of the upper bite rim is screwed in to its limit and the upper assembly 11 is placed in the patient's mouth to occupy the position of the upper denture. Modelling compound is applied to the lower base plate 16 to provide a rough, crude lower bite rim. This rim is warmed to soften it and the lower base plate is placed over the lower gums. The patient is then instructed to close his jaws to bring the bite plates together and produce an impression of the spherical surface 25 of the upper bite rim on the lower bite rim. This process is repeated until the proper distance between the jaws is registered. The lower bite rim is then chilled and trimmed to the proper form, as shown in Figures 2 and 3; i. e., to provide a smooth spherical surface matching the surface 25 of the upper bite rim, with no obstructing borders.

Then the screw 30 is backed out until its head 32 raises the upper bite rim just enough to cause the graving pins 28 to clear the lower bite rim. With the bite recorder in place, the patient can then move his lower jaw in all directions, i. e., forwardly and rearwardly, laterally and in intermediate directions, accompanied by a smooth, gliding contact of the screw head 32 on the lower bite rim; that is, the above-mentioned spherical movements of the jaws can be accomplished with a smooth, gliding contact. It may be mentioned that, to facilitate observation of the screw head 32 and graving pins 28, the outer edges of the surface 25 of the upper bite rim 14 may deviate locally from a sphericial surface sufficiently to provide windows for such observation.

Next, the screw 30 is fed into its hole 29 by degrees and after each half turn or so, the patient will be instructed to close his mouth and to execute the chewing movements; i. e., to execute the spherical movements without an opening movement. The graving pins 28 will thereupon etch the surface 26 of the lower bite rim and, as the process is repeated, the screw 30 is shortened and the graving pins 28 bite more deeply into the lower bite rim to produce concavities such as shown at 35 in Figure 2.

Figure 4:
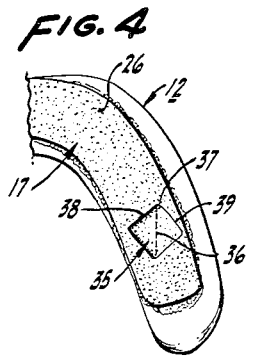
Figure 4 is a fragmentary top plan view of the lower assembly shown in Figure 3.

Referring now to Figure 4, an imaginary line 37 indicates the path of movement of a graving pin during protrusive-retractive movement, hence is a projection of such movement. The point indicated as 37 represents, or is a projection of the central occlusal point, which is the center of spherical movement, and the line 38 is a projection or tracing of the working path of the lower jaw during lateral movement. The line 39 is a projection of the balancing path during such movement. The lines 38 and 39 are boundaries of the concavity 35.

The lower jaw is, of course, capable of compound movements which have a protrusive-retractive component and a lateral component. It will, therefore, be apparent that the exercise of masticatory movements by the patient will etch out, not only the boundaries 38 and 39 but also the entire concavity 35. The depth of this concavity is a function of the departure of the mandibular movement from spherical movement.

When such tracings have been made, the upper and lower assemblies 11 and 12 are in readiness to install in a spherical articulator, such as that described in my aforesaid Patent No. 1,368,408, but preferably that described in my aforesaid copending application Serial No. 370,295. The manner in which the assemblies 11 and 12 are installed and are used to adjust the articulator will be apparent to those skilled in the art. Briefly, the lower assembly 12 is adhesively secured to a template provided with the articulator, and the incisal guide of the articulator is adjusted. Then the lower assembly will be mounted on a plaster cast, the template will be removed, the upper assembly 11 will be mounted on the articulator to occlude properly with the lower bite rim and the articulator will then be adjusted until, as it is operated, the two graving pins 28 will be guided along the edges of the work path 38 and the balancing path 39. The articulator will then be adjusted to duplicate mandibular movement and occlusion of the patient.

The bite recorder and the bite recorder technique of the present invention may, of course, be used with other spherical articulators having appropriate adjustments, e. g., with that of my aforesaid patent. It is preferably used, however, with the articulator of the aforesaid copending patent application.

It will, therefore, be apparent that a bite recorder and a bite recording technique have been provided which will accurately record or trace the spherical motions of the mandible during mastication (i. e., all these mandibular movements other than the opening and closing movement), and which can then be mounted in an adjustable articulator to duplicate the mandibular movements. The recorder and technique are relatively simple and do not require a high degree of special skill. The provision of a hard upper bite rim with graving means affixed thereto, of a soft or fusible lower bite rim and of mating spherical surfaces for these bite rims provides accurate tracings. The provision of hard, sharpened graving pins and of a flat headed screw, together with a gradual feeding in of the screw, permits a gradual tracing action, hence a smooth, accurate tracing.

Central occlusion is established positively and easily; the use of a face bow is avoided; and a simple, speedy and accurate means of adusting an articulator is provided.

I claim:

1. A bite recorder comprising upper and lower mounting members to fit the upper and lower jaws of the human mouth, complemental bite rims mounted on such mounting members to be in occlusal relation with each other when the mounting members are fitted to the human mouth, the occlusal surfaces of said rims being spherical, and means associated with one of said bite rims for making a tracing on the other of said rims as the jaws undergo masticatory movements, such tracing constituting a record of the mandibular motion associated with such masticatory movement.

2. A bite recorder comprising upper and lower mounting members to fit the upper and lower jaws of the human mouth, complemental bite rims mounted on such mounting members to be in occlusal relation with each other when the mounting members are fitted to the human mouth, the occlusal surfaces of said rims being segments of a sphere of approximately four inch radius, and means associated with one of said bite rims for making a tracing on the other of said rims as the jaws undergo masticatory movements, such tracing constituting a record of the mandibular motion associated with such masticatory movement.

3. A bite recorder comprising upper and lower mounting members to fit the upper and lower jaws of the human mouth, an upper bite rim fixed to the upper mounting member and a lower bite rim fixed to the lower mounting member, said upper bite rim being of hard transparent material and having a graving member affixed thereto operable to etch the surface of the lower bite rim, said lower bite rim being composed of a thermoplastic, organic material which is solid at normal body temperature but which is capable of fusing or warming slightly above normal body temperature.

4. A bite recorder comprising upper and lower mounting members to fit the upper and lower jaws of the human mouth, an upper bite rim fixed to the upper mounting member and a lower bite rim fixed to the lower mounting member, said upper bite rim having a graving pin projecting from the lower surface thereof and operable to etch the lower bite rim, said upper bite rim being also provided with a gauge member retractable and extensible with respect to the occlusal surface of the upper bite rim.

5. A bite recorder comprising a bite rim having the general configuration of the dental arch and having an occlusal surface for occlusion with a mating rim, a graving member fixed to said bite rim and projecting from said occlusal surface, and a gauge member also fixed to said bite rim, said gauge member being retractable and extensible in relation to said occlusal surface to control the depth of cut of said graving member in a mating rim.

6. A bite recorder comprising a base plate having the shape of the dental arch and capable of fitting over a human jaw, a bite rim fixed to said base plate, said bite rim being constructed of hard material, having the configuration of the dental arch and having a spherical occlusal surface for occlusion with a mating rim mounted on the other jaw; said recorder also comprising at least one graving pin fixed to said bite rim and projecting slightly from said occlusal surface, and a screw threaded into said bite rim in such manner as to be movable between a substantially flush position and an extended position in relation to said occlusal surface, such extended position being sufficient to cause the graving member to clear the mating rim.

7. The bite recorder of claim 6 including also a mating bite rim and a base plate therefor, each having the configuration of the dental arch, said base plate being capable of fitting over the other jaw and said other bite rim being of a fusible composition normally solid at body temperature but capable of fusing at a slightly elevated temperature to be susceptible to etching by said graving pin.

References Cited in the file of this patent

UNITED STATES PATENTS 1,764,115     Mulcahy _____ June 17, 1930